(12) United States Patent
Parvizian et al.

(10) Patent No.: US 11,939,075 B2
(45) Date of Patent: Mar. 26, 2024

(54) SYSTEMS AND METHODS FOR POWER DISTRIBUTION IN A DRONE AIRCRAFT

(71) Applicant: Sierra Nevada Corporation, Sparks, NV (US)

(72) Inventors: Hannan Parvizian, San Francisco, CA (US); Manuel Lopez, Richmond, CA (US); Guangyuan Zheng, San Francisco, CA (US)

(73) Assignee: Sierra Nevada Corporation, Sparks, NV (US)

( * ) Notice: Subject to any disclaimer, the term of this patent is extended or adjusted under 35 U.S.C. 154(b) by 388 days.

(21) Appl. No.: 17/316,601

(22) Filed: May 10, 2021

(65) Prior Publication Data

US 2021/0261265 A1    Aug. 26, 2021

Related U.S. Application Data

(62) Division of application No. 16/447,860, filed on Jun. 20, 2019, now Pat. No. 11,001,388.

(Continued)

(51) Int. Cl.
*B64D 31/06* (2006.01)
*B64C 29/00* (2006.01)
(Continued)

(52) U.S. Cl.
CPC .......... *B64D 31/06* (2013.01); *B64C 29/0025* (2013.01); *B64C 27/26* (2013.01); *B64U 30/10* (2023.01); *B64U 30/20* (2023.01); *B64U 50/11* (2023.01); *B64U 50/19* (2023.01); *B64U 50/34* (2023.01); *B64U 70/80* (2023.01)

(58) Field of Classification Search
CPC .... B64D 31/06; B64D 31/00; B64C 29/0025; B64C 27/26; B64C 2201/04; B64C 2201/06; B64C 2201/08; B64C 2201/10; B64U 30/10; B64U 70/80; B64U 30/20; B64U 50/19; B64U 50/11; B64U 50/34
See application file for complete search history.

(56) References Cited

U.S. PATENT DOCUMENTS

| 2016/0039300 A1* | 2/2016 | Wang | B64D 27/24 244/58 |
|---|---|---|---|
| 2017/0146344 A1* | 5/2017 | Clark | G01C 7/02 |

(Continued)

FOREIGN PATENT DOCUMENTS

| WO | 2018/163171 A1 | 9/2018 | |
|---|---|---|---|
| WO | WO-2018163171 A1 * | 9/2018 | B64C 17/02 |

*Primary Examiner* — Assres H Woldemaryam
*Assistant Examiner* — Aaron M Rodziwicz
(74) *Attorney, Agent, or Firm* — Mintz Levin Cohn Ferris Glovsky and Popeo, P.C.

(57) ABSTRACT

Systems and methods are configured for power distribution in a hybrid fixed-wing VTOL drone aircraft. A drone aircraft includes two modes of operation. In a first mode of operation, the internal combustion engine is shut off while an electric motor-based VTOL system provides lift and thrust. In a second mode of operation, an internal combustion engine provides thrust while a set of fixed wings provide lift. In the second mode of operation, mechanical power from the internal combustion engine provides for power generation to charge an electrical battery to power the electric motor-based VTOL system.

5 Claims, 3 Drawing Sheets

Related U.S. Application Data

(60) Provisional application No. 62/687,249, filed on Jun. 20, 2018.

(51) Int. Cl.

| | |
|---|---|
| *B64C 27/26* | (2006.01) |
| *B64U 30/10* | (2023.01) |
| *B64U 30/20* | (2023.01) |
| *B64U 50/11* | (2023.01) |
| *B64U 50/19* | (2023.01) |
| *B64U 50/34* | (2023.01) |
| *B64U 70/80* | (2023.01) |

(56) References Cited

U.S. PATENT DOCUMENTS

| | | | |
|---|---|---|---|
| 2017/0274997 A1* | 9/2017 | von Flotow | B64U 70/30 |
| 2018/0208305 A1* | 7/2018 | Lloyd | B60L 50/90 |
| 2018/0215462 A1* | 8/2018 | Fenny | B64C 3/10 |
| 2018/0323712 A1* | 11/2018 | Traube | B64D 31/00 |
| 2019/0084684 A1* | 3/2019 | Eller | B64D 27/24 |
| 2019/0100303 A1* | 4/2019 | Campbell | B64C 27/26 |
| 2019/0256202 A1* | 8/2019 | Resnick | B64C 39/024 |
| 2019/0263519 A1* | 8/2019 | Argus | B64D 31/06 |
| 2020/0156782 A1* | 5/2020 | Fenny | B64C 39/024 |

* cited by examiner

SYSTEMS AND METHODS FOR POWER DISTRIBUTION IN A DRONE AIRCRAFT

CROSS-REFERENCE TO RELATED APPLICATIONS

This application is a divisional of U.S. application Ser. No. 16/447,860, which claims the benefit of U.S. Provisional Patent Application No. 62/687,249, filed Jun. 20, 2018, which is hereby incorporated by reference in its entirety.

FIELD

The present disclosure relates to drone delivery systems, and more specifically to for power distribution for hybrid fixed-wing VTOL drone aircraft.

BACKGROUND

Drone aircraft are typically one of two types. A first type is a fixed-wing design, where lift is provided by one or more fixed wings and forward thrust is provided by a spinning propeller, ducted fan, or jet engine. A second type is a helicopter-type design where lift and forward thrust are provided by one or more vertically oriented rotors or rotary wings. Included in this second type is the so-called 'quadcopter' design which incorporates four vertical rotors. Manipulation of the relative thrust provided by each of the four rotors provides for variable vertical thrust and forward and lateral movement. Fixed-wing aircraft of the first type are generally efficient in long distance transportation. The various multicopter designs of the second type are generally less efficient but have the unique ability to take off vertically. These aircraft designs are said to be capable of Vertical Take-Off and Landing, or VTOL.

Aircraft may use various types of power for thrust and propulsion as well. One type of thrust or propulsion is electric thrust powered by battery power. Electric power may be easy to control by solid state electronics, but battery power storage density is relatively low, such that battery weight is often a significant concern in designing an aircraft. Furthermore, a fully-charged battery weighs approximately the same as a depleted battery. Fossil fuel burning internal combustion engines may also be used in drone aircraft. Liquid fuel provides several advantages. First, it is very energy dense, so an internal combustion engine may produce significant lift or thrust from a given amount of fuel. Second, is that the weight of fuel decreases as it is consumed, such that a plane becomes lighter as it flies.

SUMMARY

Described herein are hybrid fixed-wing VTOL drone aircraft with onboard charging of electrical propulsion systems. Embodiments disclosed relate to a drone aircraft design which incorporates VTOL capabilities with fixed-wing efficiencies. These drone aircraft may take-off and land under electric power in a VTOL configuration, and cruise in-between under gas powered thrust and fixed-wing lift. Drone aircraft according to various embodiments may travel hundreds of miles using this hybrid propulsion system, making multiple take-off and landing stops on the way. Such drone aircraft may be useful for drone-based delivery systems, for example.

One challenge of the hybrid design is to keep overall weight down. Embodiments disclosed herein use comparatively small chemical batteries to provide electric power for VTOL operations, and liquid fuel tanks for gas powered fixed-wing operation. The chemical batteries need only be sized to sustain limited VTOL operation, as they may be recharged from the gas engine in-flight. In this way, the best qualities and capabilities of different thrust and lift systems as well as power systems are combined. These drones then may be capable of multiple VTOL take-offs and landings with a comparatively small battery capacity, decreasing overall weight and efficiency of the drone aircraft.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements

DETAILED DESCRIPTION

Figure 1:
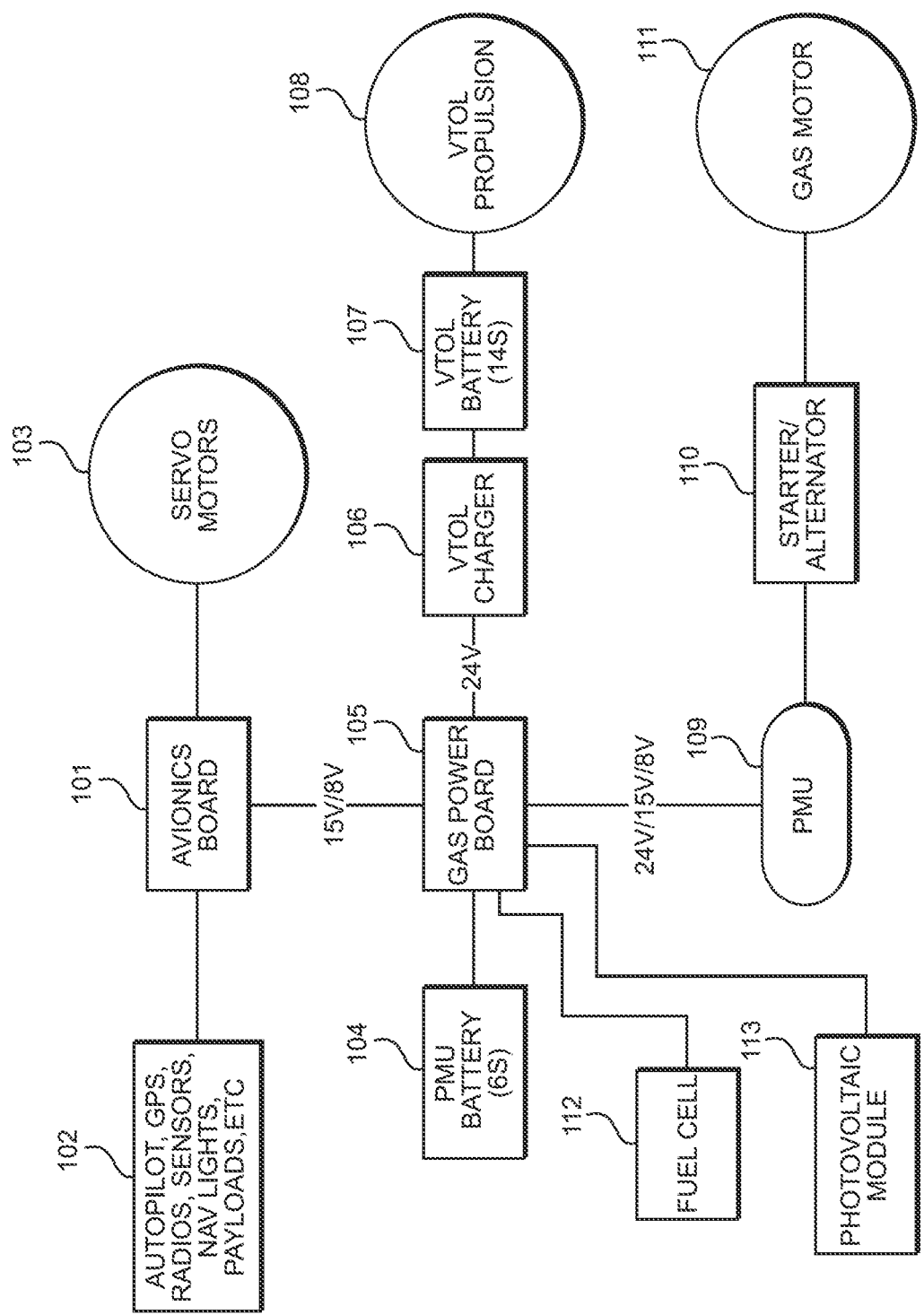
FIG. 1 illustrates a block diagram of an avionics system according to an embodiment.

Some types of drones, or Unmanned Aerial Vehicles (UAV), may use a combination of fixed wings and rotors to provide for Vertical Take-Off and Landing (VTOL) and high-speed cruising. In some hybrid-fixed wing drones, the VTOL rotors may be powered by electric motors, and forward thrust provided by a gas engine. But in some known drones, the battery capacity that powers the VTOL propulsion system may be limited because batteries are comparatively heavy. Thus, these drone systems may be limited in their hover time which limits the number of take-offs and landings possible on a single charge.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of embodiments of the invention. It shall also be understood that throughout this disclosure that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "mechanically coupled," "connected," or "electrically connected" shall be understood to include direct connections, indirect connections through one or more intermediary devices, and wireless connections.

Reference in the specification to "one embodiment," "an embodiment," "some embodiments," or "embodiments" means that a particular feature, structure, characteristic, or function described in connection with the embodiment is included in at least one embodiment of the invention and may be included more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

FIG. 1 illustrates a block diagram of an avionics system according to an embodiment. The avionics system illustrates in FIG. 1 may be a component of a hybrid VTOL drone aircraft, for example. Avionics board 101 may be a computing platform for piloting a semi-autonomous or autonomous drone aircraft. Avionics board 101 may interface with of peripheral devices 102, including, for example, CPUs, auto-pilot modules, GPS sensors, inertial sensors, LIDAR systems, air speed sensors, magnetometers, barometers, gyroscopes, radio interfaces, lights, payloads, or other such sensors or systems. Peripheral devices 102 may include one or more radio systems such as a 900 MHz radio, cellular LTE or Wi-Fi radio, or a satellite radio system such as an IRIDIUM satellite communications system. Peripheral devices 102 may also include an emergency parachute that is to be deployed in the event of the loss of loss of flight to save an aircraft from crashing.

In some embodiments, avionics board 101 may include a plurality of communications systems. For example, in an embodiment, avionics board 101 includes a 900 MHz or 2.4 GHz radio, a cellular LTE radio, and a satellite radio system. In this example, all three radio communications systems may be used concurrently for various telemetry and/or command and control purposes. In some embodiments, the plurality of communications systems may be used in a cascading failover configuration to provide redundancy and robust communications capabilities to the avionics system.

In some embodiments, avionics board 101 may be integrated with one or more of peripheral devices 102 in a single package or housing. In some embodiments, avionics board 101 may be an autopilot implemented on a computing platform specially designed for a drone aircraft. For example, in an embodiment, avionics board 101 may be a PIXHAWK® brand auto-pilot-on-module system. In another embodiment, avionics board 101 may be a PIC-COLO™ brand autopilot module. Avionics board 101 may interface with one or more servo motors 103 which actuate control surfaces of the drone aircraft. For example, servo motors 103 may actuate rudders, alerions, flaps, elevators, thrust vectoring devices, rotor orientation, collective pitch, or other such drone aircraft control surfaces.

VTOL propulsion 108 may be, for example, a set of rotors oriented to provide vertical thrust for a drone aircraft. For example, one or more electric motors may drive one or more rotors to provide vertical thrust. VTOL propulsion 108 may include one or more speed controllers that modulate the thrust provided. VTOL propulsion 108 draws electrical power from VTOL battery 107. VTOL battery 107 may be, for example, a lithium-ion type battery system, or a similar such chemical battery. VTOL battery 107 may be, for example a battery pack consisting of several individual battery cells wired in series. For example, VTOL battery 107 may be comprised of 14 cells wired in series, sometimes referred to as a ' 14S' configuration. VTOL battery 107 is charged by VTOL charger 106. VTOL charger 106 monitors the battery charge and health of VTOL battery 107 and charges VTOL battery 107 when necessary. VTOL battery 107 may be switched on or off by avionics board 101 and may also be variably controlled by avionics board 101.

Gas motor 111 may drive one or more propellers to provide forward thrust for a drone aircraft. Gas motor 111 may operate on gas combustion of a liquid fuel, for example. Starter/alternator 110 is mechanically coupled to gas motor 111 such that starter/alternator 110 is mechanically driven by the operation of gas motor 111. Starter/alternator 110 has two functions. First, it may operate as an electric motor to provide an initial mechanical energy to start gas motor 111 from a resting state. Second, starter/alternator 110 may be mechanically driven by gas motor 111 to generate an electrical current.

Additional sources of electrical power may be included in some embodiments. Some embodiments may include fuel cell system 112, photovoltaic module 113, or both fuel cell system 112 and photovoltaic module 113. In addition, some embodiments may not include either fuel cell system 112 or photovoltaic module 113. These additional electrical power sources may provide electrical power to any avionics system component, including other electrical power storage components. For example, various battery systems may be charged by these additional electrical power sources. In other embodiments, other electrical power sources may also be used.

In an example, fuel cell system 112 provides additional electrical power that may be used by various components. For example, fuel cell system 112 may provide electrical power to charge VTOL battery 107 or any other battery system. In some embodiments, fuel cell system 112 includes a plurality of fuel cell devices and accompanying regulation and management circuitry.

In another example, photovoltaic module 113 may similarly provide electrical energy to the avionics system. Photovoltaic module 113 may be comprised of a plurality of photovoltaic cells in any arrangement as well as accompanying regulation and management circuitry. For example, photovoltaic module 113 may provide electrical power to charge VTOL battery 107 or any other battery system.

Power Management Unit (PMU) 109 acts as a power regulator to route power throughout the avionics system in conjunction with gas power board 105. Gas power board 105 serves to route the various power lines between avionics board 101, VTOL charger 106, PMU 109, PMU battery 104, optional fuel cell system 112, and optional photovoltaic module 113.

In a first state, when gas motor 111 is at a high speed, starter/alternator 110 receives mechanical power from gas motor 111 and provides electrical power to PMU 109. This first state may correspond to the drone aircraft flying primarily under power of gas motor 111, using fixed wings for lift. In this state, PMU 109 receives power from starter/alternator 110 and provides three regulated power outputs. A first regulated power output is for charging VTOL battery 107. In an embodiment, this first regulated power output may be approximately 24V and capable of providing approximately 350 W of power to charge VTOL battery 107. PMU 109 also provides for a second and third regulated power output for powering avionics board 101. In an embodiment, a second regulated power output of PMU 109 may be approximately 15V and capable of providing approximately 108 W of power to avionics board 101. In an embodiment, a third regulated power output of PMU 109 may be approximately 8V and capable of providing approximately 42 W of power to avionics board 101.

In a second state, gas motor 111 is at a low speed or in an off state. This second state may correspond to, for example, a condition where a drone aircraft is under power of VTOL propulsion 108, for example during a take-off or landing event. In this second state, PMU 108 receives electrical power from PMU battery 104. Using the same regulators and power management, PMU is then able to provide the second and third regulated power output to avionics board 101. In this second state, VTOL charger 106 is disconnected, such that it does not draw power from PMU battery 104. In a transition from the second state to the first state, starter/alternator 110 draws electrical power from PMU battery 104 to mechanically start gas motor 111. After gas motor 111 is started, starter/alternator 110 may draw mechanical power from gas motor 110 to provide electrical power to PMU 109 as described above.

In some embodiments, one or more of the components illustrated in FIG. 1 may be integrated into one housing or assembly. For example, in an embodiment, PMU 109, gas power board 105, and VTOL charger 106 may be integral to each other. In some embodiments, these components may be further integrated with avionics board 101. Any other combination of components or subcomponents may be similarly employed in various embodiments.

Figure 2:
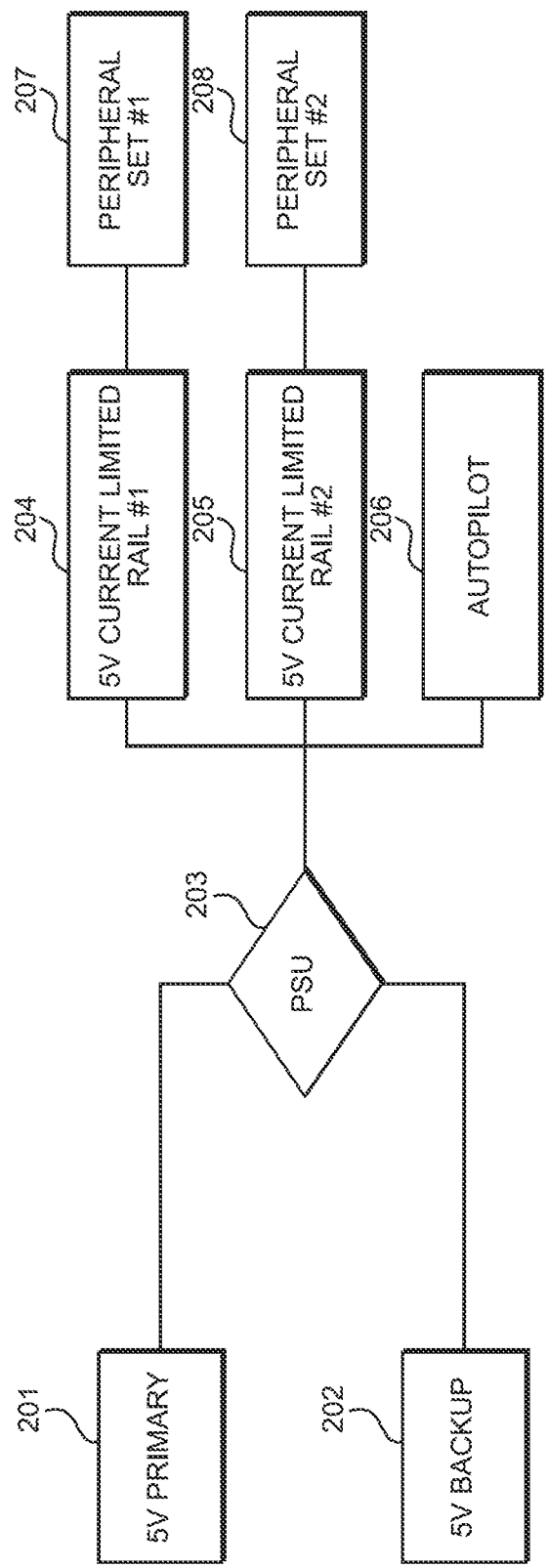
FIG. 2 illustrates a power supply architecture according to an embodiment.

FIG. 2 illustrates a power supply architecture of an avionics board according to an embodiment. Specifically, FIG. 2 illustrates a power distribution architecture for components of an avionics board such as avionics board 101, including peripheral devices such as peripheral devices 102. A loss of power to any major flight system may result in the loss of aircraft power, and ultimately the cargo it may be carrying. In an embodiment, an avionics board includes redundant power supply to ensure mission success. In some embodiments, most systems of an avionics board operate on 5V power. Two 5V power regulators 201 and 202 provide for redundant power regulation for these components. In an embodiment, each 5V power regulator is driven from a different power supply. For example, 5V primary 201 may receive input power from a 15V output from a PMU and 5V backup 202 receive input power from an 8V power output from a PMU. Power Selection Unit (PSU) 203 selects which 5V regulator to receive power from. PSU 203 monitors the output from 5V primary 201 and 5V backup 202 and switches power lines if the voltage drops out of an acceptable range. For example, if power is being drawing from 5V primary 201 and PSU 203 detects that the voltage has dropped below some threshold, for example 10%, then PSU 203 disconnects 5V primary 201 and switches to 5V backup 202. In this way, a complete failure of one of the sources of 5V power for the flight critical electronics will not cause a loss of the vehicle.

The power distribution within the avionics board is designed for reliability and robustness. In an embodiment, the various peripheral components of an avionics board are split into two group. Examples of peripherals include but are not limited to, radios, GPS devices, communication bus deices, LIDAR devices, and other such peripherals. Each group, peripheral set #1 207 and peripheral set #2 208 are driven by independent current limited rails 204 and 205. 5V current limited rail #1 and 5V current limited rail #2 may be implemented by, for example, voltage regulator circuits or fuse circuits. Due to this architecture, if any one peripheral device fails and produces a short across the 5V power supply, only those devices on the same current limited rail will be affected. In other embodiments, fewer or more current limited rails may be used. For example, one embodiment includes three current limited rails. In an embodiment, a CPU or autopilot 206 may be on its own current limited rail or directly connected to the 5V supply from PSU 203.

Figure 3:
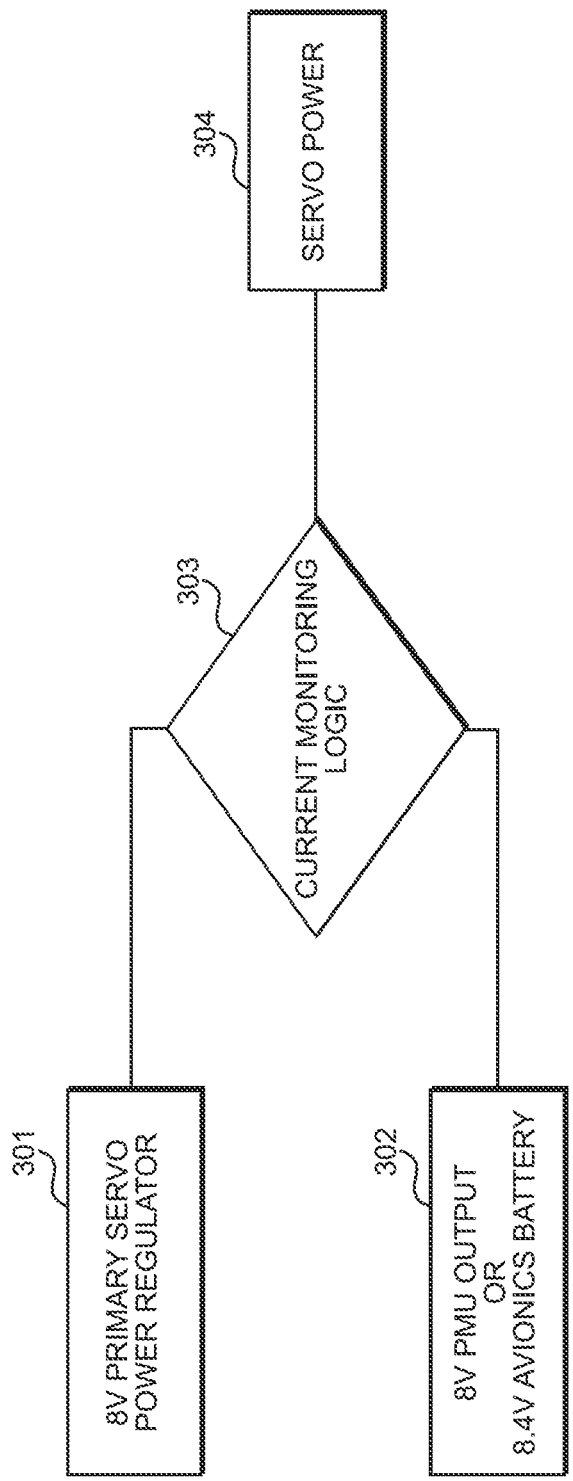
FIG. 3 illustrates a redundant servo power supply architecture according to an embodiment.

FIG. 3 illustrates a redundant servo power supply architecture according to an embodiment. Specifically, FIG. 3 illustrates a power distribution architecture for one or more servo motors such as servo motors 103. Servo motors also draw power from redundant power supplies. Servo power rail 304 provides power to one or more servo motors that control various control surfaces of a drone aircraft. 8V primary servo power regulator 301 may receive power from an output of a PMU such as a 15V output. 8V secondary servo power regulator 302 may receive power from a different output of a PMU such as an 8V output. A PMU may supply this secondary 8V output from either an alternator input or a separate battery such as a, 8.4V avionics battery. Current monitoring logic 303 monitors the output from both 8V primary servo power regulator 301 and 8V secondary servo power regulator 302 and switches power lines if the voltage drops out of an acceptable range. In some embodiments, servo power rail 304 may experience high surge current due to the operation of servo motors, so both 8V primary servo power regulator 301 and 8V secondary servo power regulator 302 may be capable of up to, for example 25A surge currents.

Other various components or peripherals of an avionics board such as avionics board 101 may be powered by other redundant power supply systems. For example, a separate power regulator may be included in an avionics board for navigation lights. As an example, FAA-mandated navigation lights may consume large amounts of power in a sporadic, transient manner. To prevent these transient fluctuations from affecting other components (including flight critical components), there is a separate power regulator for just the navigation lights. This separate regulator may be, for example a 5V regulator and receive power from a 15V output of a PMU or a battery system.

Other components or subsystems that may be powered by separate regulated power supplies may include, for example, a power supply for a communications radio, or a magnetic payload gripper. In various embodiments, any system-critical component or component that may consume large amounts of transient power may be powered by an independent power supply within an avionics board. In this way, overall system reliability may be increased by isolating power-consuming devices and preventing any one component from disabling other components in the event of a failure.

In addition, various subsystems or power delivery components may be able to be isolated by mechanical switches for safety reasons during testing and repair. In an embodiment, power for an aircraft is grouped into four systems: avionics, propulsion, VTOL propulsion, and payload. Power to each system may be independently turned off via a mechanical switch or on-board logic. An operator may choose to enable or disable any individual system via the position of toggle switches. These switches are intended to be used by technicians and operators during testing and troubleshooting. They are not intended for general use in operation. In addition, a general, system-wide switch may be included in some embodiments to fully power down all systems of a drone aircraft for similar purposes. For example, all power systems may be disconnected for storage or maintenance purposes. In some embodiments, an emergency off switch may be included that also disconnects all power systems of a drone aircraft. Such an emergency off switch may be used during testing or maintenance for emergency purposes only.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A power distribution system for a drone aircraft, comprising:
   at least one electric battery electrically connected to a power management unit installed on a drone aircraft;
   an electric propulsion system that produces vertical thrust, electrically connected to the at least one electric battery, wherein the drone aircraft performs Vertical Take-Off and Landing (VTOL) under power of the electric propulsion system;
   an internal combustion propulsion system, separate from the electric propulsion system, configured to produce forward thrust independent of the electric propulsion system; and
   an electric generator mechanically coupled to the internal combustion propulsion system and electrically connected to the power management unit through a mechanical switch configured to selectively disconnect the power management unit from the electric generator;
   wherein, in VTOL flight, the mechanical switch is actuated into an open position, isolating the electric generator and the internal combustion propulsion system from the power management unit and at least one electric battery;
   a first voltage regulator electrically connected to a first electric power supply and configured to draw power from the first electric power supply;
   a second voltage regulator electrically connected to a second electric power supply and configured to draw power from the second electric power supply;
   a power selection unit electrically connected to the first voltage regulator and the second voltage regulator, and configured to draw power from the first voltage regulator; and
   a first set of electronic devices electrically connected to the power selection unit and configured to draw power from the power selection unit,
   wherein the power selection unit is configured to draw power from the second voltage regulator in response to detecting a failure condition of the first voltage regulator.

2. The power distribution system of claim 1, wherein the first set of electronic devices includes a first current limiting device configured to disconnect the first set of electronic devices from the power selection unit in response to the first set of electronic devices drawing an electric current greater than a threshold current.

3. The power distribution system of claim 2, further comprising:
   a second set of electronic devices electrically connected to the power selection unit and configured to draw power from the power selection unit,
   wherein the second set of electronic devices includes a second current limiting device configured to disconnect the second set of electronic devices from the power selection unit in response to the second set of electronic devices drawing an electric current greater than a threshold current.

4. The power distribution system of claim 1, wherein the first electric power supply is the same as the second electric power supply.

5. The power distribution system of claim 1, wherein the failure condition is that the voltage supplied by the first voltage regulator is below a threshold voltage.

* * * * *